(No Model.)

P. D. THOMPSON.
GRAIN CUT-OFF.

No. 481,080. Patented Aug. 16, 1892.

WITNESSES:
Fred G. Dieterich
Jos. A. Ryan

INVENTOR:
P. D. Thompson
BY
ATTORNEYS

UNITED STATES PATENT OFFICE.

PHILANDER D. THOMPSON, OF NELIGH, NEBRASKA.

GRAIN CUT-OFF.

SPECIFICATION forming part of Letters Patent No. 481,080, dated August 16, 1892.

Application filed March 12, 1892. Serial No. 424,730. (No model.)

*To all whom it may concern:*

Be it known that I, PHILANDER D. THOMPSON, residing at Neligh, in the county of Antelope and State of Nebraska, have invented certain new and useful Improvements in Grain Cut-Offs, of which the following is a specification.

This invention relates to a combined cut-off and delivery-spout for grain-handling appliances, and is particularly adapted for feed-hoppers used in granaries, elevators, mills, and the like, the object of the invention being to provide a cheap and efficient device that can be operated either to cut off the supply of grain completely or cut it off from one point and direct its delivery to another.

A further object is to so construct the device that no grain can escape between the operating parts and clog the machine; and a still further object is to so construct and combine the parts that the various openings will register accurately and a large amount of friction be avoided.

My invention consists in certain details of construction and combination of parts, which will be fully explained hereinafter, and pointed out in the claim, whereby the various objects are accomplished.

Figure 1:
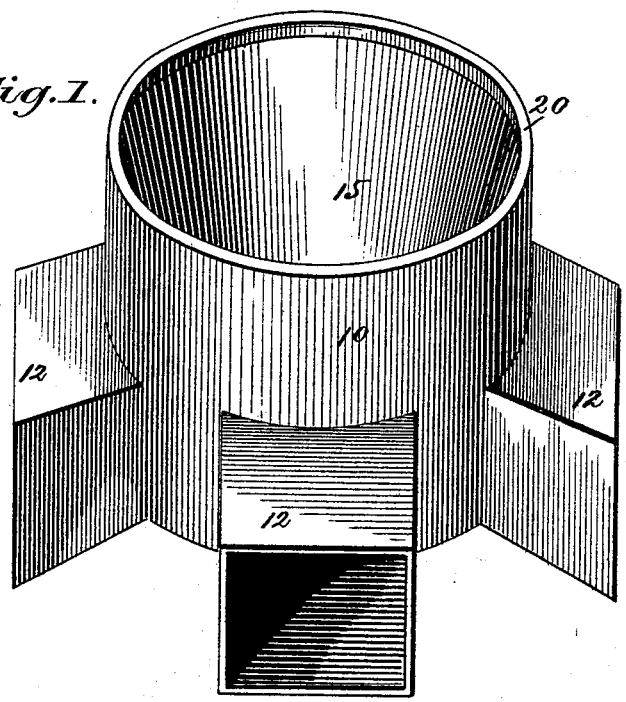
Figure 2:
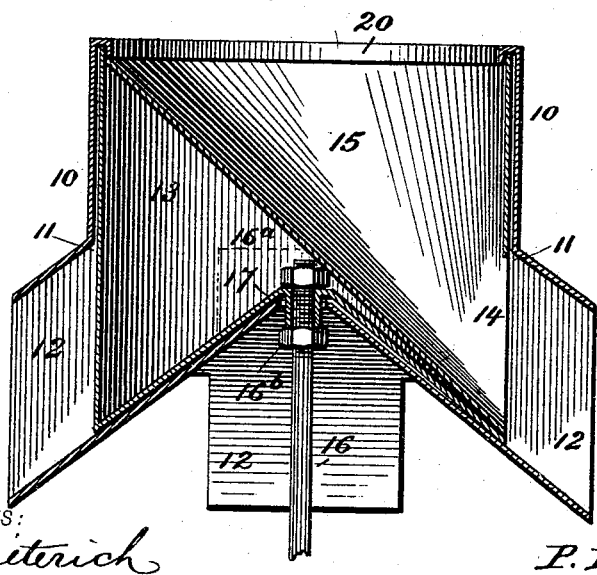

In the drawings forming a part of this specification, Figure 1 is a perspective view of my improved cut-off. Fig. 2 is a vertical longitudinal section of the same.

In carrying out my invention I employ an outer cylinder 10, having a series of discharge-openings 11 and a delivery-spout 12, attached to the cylinder 10 at each discharge-opening, the bottom of the spout being flush with the bottom of the cylinder. An inner revoluble cylinder fits snugly within the stationary cylinder and has a single discharge-opening 14, which is adapted to be moved into and out of register with the delivery-spout 12 as the inner cylinder is revolved, as hereinafter explained.

A funnel-shaped hopper 15 is rigidly secured within the revoluble cylinder, the upper edge of the funnel being joined to the sides of the cylinder, and the discharge-spout is coincident with the discharge-opening 14. By this means all grain fed to the device will be guided through the discharge-opening to any of the delivery-spouts with which it may be made to register.

The bottom of the inner cylinder is shaped to correspond with the bottom of the outer one, upon which it rests, and in order to revolve the inner cylinder I provide a revoluble shaft 16, which is secured within a sleeve 17 by means of the upper and lower nuts $16^a$ and $16^b$, respectively, said sleeve being rigid with the inner bottom and passes through a central aperture 19 in the outer bottom.

Any suitable mechanism may be employed to revolve the shaft, and by moving it in either direction the discharge-spout of the funnel-shaped hopper may be made to register with any one of the delivery-spouts 12, thus changing the supply from one spout to another, or the supply may be cut off completely by throwing the discharge-opening out of registry.

An annular overlapping flange 20 is secured to the upper edge of the outer cylinder and overlaps the upper edge of the inner one, thus preventing any grain falling between the cylinders, which would tend to choke the machine, and this flange may be either integral with the outer cylinder or secured thereto.

In practice I prefer to make the discharge-openings at the lower edges of the sides employ conical bottoms for the purpose of reducing friction and insuring accuracy of registry, and have the bottoms of the delivery-spouts in alignment with the adjacent portions of the outer bottom.

Having thus described my invention, what I claim, and desire to secure by Letters Patent, is—

The combination, with an outer stationary cylinder having a series of discharge-openings in its sides, a centrally-apertured conical bottom, and a delivery-spout at each opening, of an inner revoluble cylinder having a centrally-apertured conical bottom and a single discharge-opening in its side, a funnel-shaped hopper rigidly secured within the inner cylinder, the overlapping flange secured to the outer cylinder and adapted to overlap the upper edge of the inner cylinder, the tube passed through the outer bottom and secured in the aperture of the inner bottom, the operating-shaft passed through the tube, and the nuts secured upon the shaft above and below the tube and adapted to bear upon the ends of tube, substantially as shown and described.

PHILANDER D. THOMPSON.

Witnesses:
CHAS. R. ALLDER,
H. E. KRYGER.